(12) United States Patent
Klippel

(10) Patent No.: US 11,170,416 B2
(45) Date of Patent: Nov. 9, 2021

(54) SYSTEM, WEBSITE, AND APPLICATION TO MATCH BABYSITTERS WITH PEOPLE REQUESTING BABYSITTING SERVICES

(71) Applicant: Casey Klippel, Strongsville, OH (US)

(72) Inventor: Casey Klippel, Strongsville, OH (US)

( * ) Notice: Subject to any disclaimer, the term of this patent is extended or adjusted under 35 U.S.C. 154(b) by 278 days.

(21) Appl. No.: 16/008,192

(22) Filed: Jun. 14, 2018

(65) Prior Publication Data

US 2019/0385204 A1    Dec. 19, 2019

(51) Int. Cl.
*G06Q 30/00* (2012.01)
*G06Q 30/06* (2012.01)
*H04L 29/08* (2006.01)
*G06F 9/54* (2006.01)
*G06F 16/9535* (2019.01)

(52) U.S. Cl.
CPC ......... *G06Q 30/0605* (2013.01); *G06F 9/542* (2013.01); *G06F 16/9535* (2019.01); *H04L 67/306* (2013.01)

(58) Field of Classification Search
CPC ......... G06Q 10/06311; G06Q 10/1095; G06Q 30/0605; G06F 16/9535; G06F 9/542; H04L 67/306
See application file for complete search history.

(56) References Cited

U.S. PATENT DOCUMENTS

| | | | |
|---|---|---|---|
| 2005/0021350 A1* | 1/2005 | Scott | G06Q 10/10 705/320 |
| 2007/0073610 A1* | 3/2007 | Marugabandhu | G06Q 40/04 705/37 |
| 2010/0174727 A1* | 7/2010 | Zappacosta | G06Q 30/0629 707/754 |
| 2016/0267438 A1* | 9/2016 | Sobol | G06Q 10/1095 |
| 2016/0275439 A1* | 9/2016 | Avats | G06Q 10/1053 |
| 2016/0335694 A1* | 11/2016 | Catino | G06F 16/29 |
| 2016/0373398 A1* | 12/2016 | Donahoe | G06Q 50/10 |
| 2017/0235766 A1* | 8/2017 | Mawji | G06F 16/9035 707/722 |

* cited by examiner

*Primary Examiner* — Mila Airapetian
(74) *Attorney, Agent, or Firm* — The Iwashko Law Firm, PLLC; Lev Ivan Gabriel Iwashko

(57) ABSTRACT

A system having a program running thereon to match babysitters with a user requesting babysitting services, the system including a storage unit to store data regarding the babysitters, a first apparatus having an input unit to allow the user to post a babysitting job via the program, and a second apparatus, including a display unit to allow at least one of the babysitters to view the posed babysitting job, based on information requested by the user matching the data stored in the storage unit, and an input unit to allow the at least one of the babysitters to respond to the posted babysitting job.

4 Claims, 1 Drawing Sheet

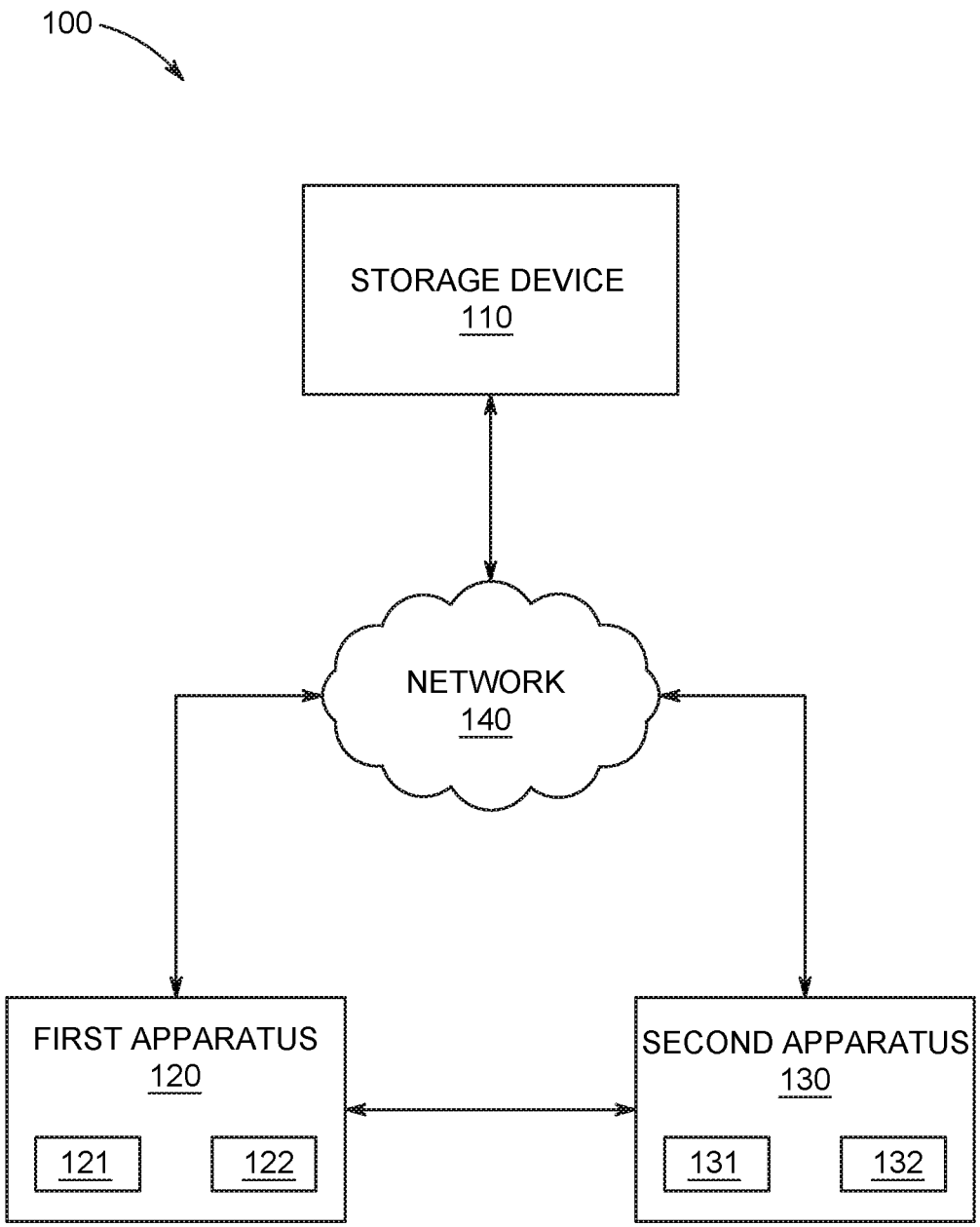

SYSTEM, WEBSITE, AND APPLICATION TO MATCH BABYSITTERS WITH PEOPLE REQUESTING BABYSITTING SERVICES

BACKGROUND

1. Field

The present general inventive concept relates generally to a system and a website and/or application to match babysitters with people requesting babysitting services.

2. Description of the Related Art

Parenting is not always an easy job: to be able to do things like get an oil change, run to the bank or pick up a coffee at a coffee shop can take hours if needing to have one's children in tow, getting them ready to leave the house, etc. Emergency situations can also be unpredictable, and on occasion, finding immediate childcare may be necessary, but not always feasible to find, especially in the later hours of the evening. Also, agencies that provide babysitting services may be expensive and unreliable, as babysitters are not always available for hire Therefore, there is a need for a mobile application to match babysitters with people requiring babysitting services.

SUMMARY

The present general inventive concept provides a system and a website and/or application to match babysitters with people requesting babysitting services.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a system having a program running thereon to match babysitters with a user requesting babysitting services, the system including a storage unit to store data regarding the babysitters, a first apparatus having an input unit to allow the user to post a babysitting job via the program, and a second apparatus, including a display unit to allow at least one of the babysitters to view the posed babysitting job, based on information requested by the user matching the data stored in the storage unit, and an input unit to allow the at least one of the babysitters to respond to the posted babysitting job.

The system may further include a network to allow communication between the storage unit, the first apparatus, and the second apparatus.

The first device and the second device may be mobile telephones.

The second apparatus may receive a notification that the babysitting job has been posted if criteria requested by the user matches the data stored in the storage unit.

BRIEF DESCRIPTION OF THE DRAWINGS

These and/or other features and utilities of the present generally inventive concept will become apparent and more readily appreciated from the following description of the embodiments, taken in conjunction with the accompanying drawings of which:

FIG. 1 illustrates a system to provide babysitters to clients, according to an exemplary embodiment of the present general inventive concept.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

FIG. 1 illustrates a system 100 to provide babysitters or providers to customers, according to an exemplary embodiment of the present general inventive concept.

The system 100 may include a storage device 110, a first apparatus 120, a second apparatus 130, and a network 140, but is not limited thereto.

Herein, a customer may use the first apparatus 120 to find a particular babysitter using the second apparatus 130, via a mobile and/or software application.

The storage device 110 may include a server, a computing device with a storage unit, and a cloud-based storage space, but is not limited thereto. The storage device 110 may store at least one of registration information of profiles of potential babysitters, resumes, files, requests, request acceptances, programs, application data, code, and any other information pertaining to babysitters and/or babysitting jobs.

The storage device 110 may also include an embedded background application that will be required by most or all babysitters to fill out and renew periodically, every predetermined number of years (e.g., 2 years). This background check may be visible to all customers once they click on a profile of a babysitter. Every babysitter may have his/her own profile where they will include information about themselves related to the services they offer.

The first apparatus 120 may include a computing device that may receive input, transmit data, receive data, access the Internet, provide global positioning services (GPS), and communicate with other devices or systems via a network, and may include a desktop computer, a laptop computer, a tablet computer, or a mobile device, such as a cellular phone or a smart phone, but is not limited thereto.

The first apparatus 120 may access the Internet to allow a user to access a website to find babysitters. The first apparatus 120 may also have stored thereupon a software application that allows the user to find babysitters corresponding to criteria specified by the user, such as proximity, availability, cost, rate, gender, etc. Also, the software application may have profiles of various babysitters stored therein, which are all accessible by the first apparatus.

The first apparatus 120 may include an input unit 121 to allow the user to input data into the first apparatus 120, and a display unit 122 to allow the user to view data displayed on the display unit 122.

The second apparatus 130 may access the Internet to allow a babysitter to view babysitting jobs that are desired by families. The second apparatus 130 may also have stored thereupon a software application to allow the babysitter to receive requests for babysitting jobs.

The second apparatus 130 may include an input unit 131 to allow the user to input data into the second apparatus 130, and a display unit 132 to allow the user to view data displayed on the display unit 132.

The software application stored on the first apparatus 120 may include a GPS map viewable on the display unit 122, which is always current and updated. The customer may click and unclick services they are looking for using the input unit 121 of the first apparatus 120, and the clicked services will show up (i.e., glow) on the map "if and only if a specific babysitter has turn himself/herself ON for that time period," meaning he/she is readily available to quickly provide the babysitting service.

Once the customer views a particular babysitter's profile on the display unit 122 of the first apparatus 120 and decides to hire him/her, a quick messaging form may pop up on the display unit 122, and the customer may fill in the questions and hit SEND using the input unit 121. The babysitter may receive an instant notification of the message request on the display unit 132 of the second apparatus 130 via the software application running on the second apparatus 130. The babysitter may then use the input unit 131 of the second device 130 to respond with how soon he/she will be there for the customer. If the babysitters are not "ON" and showing on the map on the display unit 122 of the first device 120, they will not be able to be hired for a service at that time.

Customers may use the input unit 121 of the first device 120 to pay for the service through the application and/or website. Babysitters may also be paid from the application and/or website through direct deposit, which may be connected to a bank directly from the application and/or website.

Referring to FIG. 1, the network 140 may be at least one of the Internet, a cellular network, a universal mobile telecommunications systems (UMTS) network, a Long Term Evolution (LTE) network, a Global System for Mobile Communications (GSM) network, a local area network (LAN), a virtual private network (VPN) coupled to the LAN, a private cellular network, a private telephone network, a private computer network, a private packet switching network, a private line switching network, a private wide area network (WAN), a corporate network, or any number of private networks that can be referred to as an Intranet. The network 140 can be implemented with any number of hardware and software components, transmission media, and network protocols. FIG. 1 illustrates the network 140 as a single network, but is not limited thereto.

The first apparatus 120 and the second apparatus 130 can both can send data to, and receive data from, the storage device 110 over via the Internet or any of the above-mentioned networks. The first apparatus 120 and the second apparatus 130 can be directly coupled to the storage device 110. Alternatively, the first apparatus 120 and the second apparatus 130 can be connected to the storage device 110 via any other suitable device, communication network, or combination thereof. For example, the first apparatus 120 can be coupled to the storage device 110 via routers, switches, access points, and/or communication networks. In other words, the storage device 110, the apparatus 120, and the apparatus 130 may all communicate with each other via the network 140.

As such, the user may use the first apparatus 120 to search profiles of various babysitters, in order to see locations, availability, pricing, and experience level of babysitters in an area near the user, and then send babysitting job requests to babysitters who fit the profiles of the type of person the user is seeking.

Likewise, the babysitter may use the second apparatus 130 to view babysitting jobs that are being offered, and to respond to jobs.

Alternatively, the user may use the first apparatus 120 to post the babysitting job, and the babysitter may receive a notification on the second apparatus 130 that the babysitting job has been posted, and then may use the second apparatus to respond to the babysitting job request.

Furthermore, the present general inventive concept is not limited to babysitters of children, but also applies to babysitters and/or providers for the elderly (i.e., caretakers of the elderly). As such, the system 100 may be utilized to provide providers and/or caretakers of people of all ages to customers.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A system having a program running thereon to match babysitters with a user requesting babysitting services, the system comprising:

a storage device to store a register of the babysitters and include an embedded background application that requires renewal of a background check every predetermined number of years;

a first apparatus to post a babysitting job via the program to the register of babysitters; and a second apparatus, comprising:

a display unit to display the posted babysitting job from the register of the babysitters, based on information matching the register of the babysitters stored in the storage device, and an input unit to receive an input to respond to the posted babysitting job and indicate availability on a map displayed on the first apparatus in response to turning on availability for a time period, such that a quick messaging form pops up on the first apparatus including questions to be filled, such that the first apparatus receives a response from the second apparatus and the display unit displays an instant notification of a message request from the first apparatus, such that the input unit receives, from the first apparatus, an indication of how soon babysitting services are needed, such that the first apparatus prevents display of notification of a message in response to the availability not being turned on, such that the first apparatus displays clicked services on the map in response to the availability for the time period being turned on.

2. The system of claim 1, further comprising:

a network to allow communication between the storage device, the first apparatus, and the second apparatus.

3. The system of claim 1, wherein the first apparatus and the second apparatus are mobile telephones.

4. The system of claim 1, wherein the second apparatus receives a notification that the babysitting job has been posted if criteria matches the data stored in the storage device.

\* \* \* \* \*